(12) United States Patent
Katsuma et al.

(10) Patent No.: US 8,009,544 B2
(45) Date of Patent: Aug. 30, 2011

(54) OBJECTIVE LENS, OPTICAL PICKUP DEVICE HAVING THE SAME, AND RECORDING AND/OR REPRODUCING APPARATUS FOR OPTICAL RECORDING MEDIUM, EQUIPPED WITH THE OPTICAL PICKUP DEVICE

(75) Inventors: Toshiaki Katsuma, Saitama (JP); Masao Mori, Saitama (JP); Tetsuya Ori, Saitama (JP); Yu Kitahara, Saitama (JP)

(73) Assignee: Fujinon Corporation, Saitama-Shi, Saitama (JP)

( * ) Notice: Subject to any disclaimer, the term of this patent is extended or adjusted under 35 U.S.C. 154(b) by 115 days.

(21) Appl. No.: 12/273,251

(22) Filed: Nov. 18, 2008

(65) Prior Publication Data
US 2009/0129243 A1    May 21, 2009

(30) Foreign Application Priority Data
Nov. 19, 2007   (JP) ................ P2007-299435

(51) Int. Cl.
*G11B 7/135* (2006.01)

(52) U.S. Cl. .................................... 369/112.23

(58) Field of Classification Search ......... None
See application file for complete search history.

(56) References Cited

U.S. PATENT DOCUMENTS

| | | | |
|---|---|---|---|
| 6,147,956 A | 11/2000 | Jutte et al. | |
| 6,411,442 B1 | 6/2002 | Ota et al. | |
| 6,636,366 B1 | 10/2003 | Itonaga | |
| 7,110,344 B2 * | 9/2006 | Kimura | 369/112.23 |
| 7,167,317 B2 * | 1/2007 | Jung et al. | 359/652 |
| 2002/0012313 A1 | 1/2002 | Kimura et al. | |
| 2003/0123372 A1 | 7/2003 | Kimura | |
| 2005/0286354 A1 * | 12/2005 | Shinkai et al. | 369/44.14 |
| 2006/0039266 A1 | 2/2006 | Kimura et al. | |

FOREIGN PATENT DOCUMENTS

| | | |
|---|---|---|
| JP | 2001-324673 A | 11/2001 |
| JP | 2002-100067 A | 4/2002 |
| JP | 2003-5032 A | 1/2003 |

OTHER PUBLICATIONS

Notice of Allowance issued in U.S. Appl. No. 12/273,139 on Mar. 16, 2011.
U.S. Office Action issued in U.S. Appl. No. 12/273,139 on Sep. 17, 2010.
U.S. Office Action issued in U.S. Appl. No. 12/273,193 on Nov. 15, 2010.
Office Action issued in copending U.S. Appl. No. 12/273,193 on Apr. 26, 2011.

* cited by examiner

*Primary Examiner* — Hoa T Nguyen
*Assistant Examiner* — Emily Frank
(74) *Attorney, Agent, or Firm* — Birch, Stewart, Kolasch & Birch, LLP

(57) ABSTRACT

An objective lens consists of a single lens element. A light source side surface is formed into a convex surface having a large curvature, and an optical recording medium side surface has a small curvature. The both surfaces are formed into aspheric surfaces. Also, the objective lens satisfies the following expressions (1) to (3):

$$0.70 < NA < 0.98 \quad (1)$$
$$0.70 < d/f < 3.00 \quad (2)$$
$$0.50 < g/d < 0.80 \quad (3)$$

where NA denotes a numerical aperture of the objective lens on an optical recording medium side,
d denotes a thickness, in mm, of the objective lens on an optical axis, and
g is a distance, in mm, from a tangential plane that is perpendicular to the optical axis and is tangent to a vertex of the light source side surface of the objective lens, to a center of gravity of the objective lens.

13 Claims, 10 Drawing Sheets

Example 1

OBJECTIVE LENS, OPTICAL PICKUP DEVICE HAVING THE SAME, AND RECORDING AND/OR REPRODUCING APPARATUS FOR OPTICAL RECORDING MEDIUM, EQUIPPED WITH THE OPTICAL PICKUP DEVICE

CROSS-REFERENCE TO RELATED APPLICATIONS

This application is based upon and claims the benefit of priority from the Japanese Patent Application No. 2007-299435 filed on Nov. 19, 2007; the entire contents of which are incorporated herein by reference.

BACKGROUND OF THE INVENTION

1. Technical Field

The invention relates to an objective lens capable of efficiently converging used light onto an optical recording medium when information is recorded or reproduced, an optical pickup device and a recording and/or reproducing apparatus for the optical recoding medium. Specifically, the invention relates to an objective lens for used in recording/reproducing a high density optical recording medium with blue light having a short wavelength, an optical pickup device, and a recording and/or reproducing apparatus for the optical recording medium.

2. Description of the Related Art

Recently, various optical recording media such as DVD (digital versatile disc) and CD (compact disc which includes CD-ROM, CD-R, and CD-RW) have been widely used in various applications. However, in response to a rapid increase in data volume, an increase in storage capacity of an optical recording medium has been strongly demanded. It has been known that a decrease in wavelength of used light of a light source and an increase in numerical aperture (NA) of an objective lens are effective to increase a storage capacity of an optical recording medium. Based on this knowledge, the blu-ray disc (herein after referred to as "BD") having about 25 GB in a single sided single layer has been put to practical use. For the BD, light which is emitted from a semiconductor laser (for example, emitting laser light having a wavelength of 405 nm) having a short wavelength light output is used as irradiation light, and a numerical aperture is increased to be equal to or greater than 0.7. In the specifications of the BD, the numerical aperture and a thickness of a protection layer (for example, the numerical aperture (NA) is 0.85, and the thickness of the protection layer is 0.1 mm) are set quietly different from those of DVD and CD.

However, in future, a further increase in density will inevitably be demanded, but it might be hard to satisfy this demand by promoting a decrease in wavelength. This is because optical transmittance of lens materials is rapidly reduced in the range of a wavelength λ less than 350 nm and thus, it is hard to obtain sufficient optical efficiency in practice.

Another way for achieving high density is to further increase the numerical aperture of the objective lens.

Meanwhile, when a lens having a large numerical aperture (hereinafter, it is referred to as a "high NA") is designed, a single lens structure is effective to solve problems such as an increase in process number during assembly, deterioration in production efficiency, and an increase in cost.

Also, the objective lens for recording/reproducing an optical recording medium tends to be too large in on an optical axis. Accordingly, in a high NA single lens, a thickness d on the optical axis is set to be in a predetermined range which is defined based on a relation between the thickness d and a focal length f, and so excellent image height characteristic are obtained (see JP 2001-324673 A (corresponding to U.S. Pat. No. 6,411,442) and JP 2003-5032 A (corresponding to U.S. Pat. No. 7,110,344)).

Meanwhile, the objective lens for use in recording and reproducing an optical recording medium is configured so that a servo mechanism controls a focusing operation and a tracking operation. During those operations, it is required to secure a stable operation of the optical pickup apparatus. However, JP 2001-324673 A and JP 2003-5032 A don't sufficiently consider this view point.

Then, JP 2002-100067 A relates to such an objective lens, and describes such a design that a center of gravity of the objective lens is shifted to an convex optical surface on a light source side from a boundary surface between this optical surface and an edge portion (flange portion) that is used to mount the objective lens and is formed closer to an optical recording medium side than the optical surface. This design is intended to suppress the objective lens from rolling and to ensure the stable operation of the optical pickup apparatus when the focusing control and the tracking control are performed.

The objective lens described in JP 2002-100067 A is formed so that the center of gravity of the objective lens is shifted to the convex optical surface on the light source side from the boundary surface between this optical surface and the edge portion (flange portion), which is used to mount the objective lens and is formed closer to an optical recording medium side than the optical surface. However, this condition is not defined in consideration of, for example, the case where the optical recording medium side surface of the objective lens is required to have a convex shape or the case where it is necessary to set a thickness of the edge section in the optical axis direction to be large to a certain extent. Thus, this condition does not correspond to a condition for securing the stable operation of the optical pickup apparatus, and so reduces degree of freedom in design of the objective lens.

SUMMARY OF THE INVENTION

The invention has been made in consideration of this situation and provides an objective capable of obtaining excellent image height characteristic, satisfactorily securing an operating distance, achieving reduction in weight of the lens and securing a stable operation of an optical pickup apparatus without deterioration of degree of freedom in lens design even when the objective lens for recording information into or reproducing information from an optical recording medium is used as a high NA single lens element capable of converging short wavelength light onto an optical recording layer. The invention also provides the optical pickup apparatus and a recording and/or reproducing apparatus for an optical recording medium.

According to an aspect of the invention, an objective lens converges used light on a desired position of an optical recording medium which information is recorded in or reproduced from. The objective lens consists of a single lens element having at least one aspheric surface. The following conditional expressions (1) and (2) are satisfied:

$$0.70 < NA < 0.98 \quad (1)$$

$$0.50 < g/d < 0.80 \quad (2)$$

where NA denotes a numerical aperture of the objective lens on an optical recording medium side, d denotes a thickness, in mm, of the objective lens on an optical axis, and g is a distance, in mm, from a first tangential plane that is perpendicular to the optical axis and is tangent to a vertex of a light source side surface of the objective lens, to a center of gravity of the objective lens.

Also, it is preferable that the following conditional expression (3) is further satisfied:

$$0.70 < d/f < 3.00 \qquad (3)$$

where f denotes a focal length of the objective lens in mm.

Also, it is more preferable that the following conditional expression (3') is satisfied in place of the conditional expression (3):

$$0.70 < d/f < 1.40 \qquad (3').$$

Also, it is preferable that the following conditional expression (4) is further satisfied:

$$0.35 < X < 0.80 \qquad (4),$$

where X is equal to $(X1-X2) \cdot (n-1)/(NA \cdot f)$, n denotes a refractive index of the objective lens at a wavelength of the used light, X1 denotes a distance, in mm and in an optical axis direction, between the first tangential plane and a most outside position within an effective diameter of the light source side surface, which is a position on the light source side surface on which a marginal ray having the NA is incident and X1 is defined so that a direction toward the optical recording medium from the first tangential plane serving as a reference point is a positive direction and that a direction toward the light source from the first tangential plane is a negative direction, and X2 is a distance, in mm and in the optical axis direction, between (a) a second tangential plane that is perpendicular to the optical axis and is tangent to a vertex of an optical recording medium side surface and (b) a most outside position within an effective diameter of the optical recording medium side surface, which is a position on the optical recording medium side surface on which the marginal ray having the NA is incident, and X2 is defined so that a direction toward the optical recording medium from the second tangential plane serving as a reference point is a positive direction and a direction toward the light source from the second tangential plane is a negative direction.

Also, it is more preferable that the following conditional expression (4') is satisfied in place of the conditional expression (4):

$$0.48 < X < 0.55 \qquad (4').$$

Also, it is preferable that the following conditional expression (5) is satisfied:

$$1.0 \leq \Phi A \leq 5.0 \qquad (5)$$

where $\Phi A$ denotes the effective diameter of the light source side surface of the objective lens.

Also, it is preferable that the following conditional expression (6) is further satisfied:

$$0.25 < Y < 0.65 \qquad (6),$$

where Y is equal to $R1/(n \cdot f)$, and

R1 denotes a radius of curvature of the light source side surface of the objective lens near the optical axis.

Also, a wavelength of the light may be 405.0±5.0 nm.

Also, a wavelength of the light may be 405.0±5.0 nm, the numerical aperture NA may be 0.85, and a thickness of a protective layer of the optical recording medium may be 0.1 mm.

Also, it is preferable that a wavelength of the light is 405.0±5.0 nm, that the numerical aperture NA is 0.85, that aberration may is minimized at a position being distant t1 mm from a surface of the optical recording medium to an inside of the optical recording medium, and that the following conditional expression (7) is satisfied.

$$0.075 \leq t1 \leq 0.1 \qquad (7)$$

It is preferable that a mass of the objective lens is 0.5 grams or less.

According to another aspect of the invention, an optical pickup device includes the objective lens set forth above, and an actuator that performs a focusing operation of the objective lens and a tracking operation of the objective lens.

According to further another aspect of the invention, a recording and/or reproducing apparatus for an optical recording medium includes the optical pickup device set forth above.

According to the aspect of the invention, the objective lens is configured to satisfy the conditional expression (1), and to have a large numerical aperture, that is, 0.70 to 0.98. Therefore, it is possible to decrease a diameter of a spot focused on the optical recording medium. Thus, it is possible to record information with higher density even on an optical recording medium which will be developed in future or to reproduce information recorded with higher density therefrom.

Furthermore, at least one surface of the objective lens is formed into an aspheric surface. Therefore, it is possible to satisfactorily correct various aberrations such as a spherical aberration and a coma aberration.

Also, if the objective lens consists of the single lens element, alignment adjustment during assembly is not required, and production efficiency and reduce costs can be achieved.

Furthermore, the conditional expression (2) is set so that a ratio of g/d is larger than 0.5 and smaller than 0.8, where d denotes the thickness of the objective lens on the optical axis, and g denotes the distance from the first tangential plane, which is perpendicular to the optical axis and is tangent to the vertex of the light source side surface 8a of the objective lens, to the center of gravity G of the objective lens. That is, the conditional expression (2) is premised on such a heuristic that for the purpose of ensuring the stable operation of the optical pickup apparatus, the center of gravity of the objective lens should not be disposed in a position excessively distant from a middle point of the thickness on the optical axis. Also, the optical pickup objective lens has such a shape that a convex surface having a large curvature is directed toward the light source side. Thus, unless the center of gravity of the objective lens is set to be in a predetermined range on the optical recording medium side of the middle point of the thickness on the optical axis, it may be hard to secure the stable operation of the optical pickup apparatus depending on the shape of the objective lens, and furthermore, degree of freedom in lens design is greatly restricted. In consideration of these situations, the conditional expression (2) is defined. Accordingly, by satisfying the conditional expression (2), it is possible to secure the stable operation of the optical pickup apparatus without deterioration in degree of freedom of lens design.

Also, the objective lens is configured to satisfy the conditional expression (3). In the single lens element having a high NA, a condition for obtaining an excellent image height characteristic, which is defined by the focal length f and the thickness d on the optical axis of the lens, are set to be in the predetermined range. Thereby, a thickness of the objective lens does not become excessively large, and high-order components of various aberrations in assessing the image height characteristic with a wavefront aberration do not become excessively large. Thus, it is possible to obtain excellent image height characteristic.

By satisfying the conditional expression (3), a lens weight is greatly reduced and it is possible to satisfactorily secure the operating distance. Thus, it is possible to meet future demands for a decrease in power for driving the objective lens and a decrease in size of an apparatus.

The optical pickup device and the recording and/or reproducing apparatus according to the aspect of the invention include the objective lens of the aspect of the invention. Therefore, it is possible to obtain the same effect as the objective lens.

DETAILED DESCRIPTION OF EMBODIMENTS OF THE INVENTION

Figure 1:
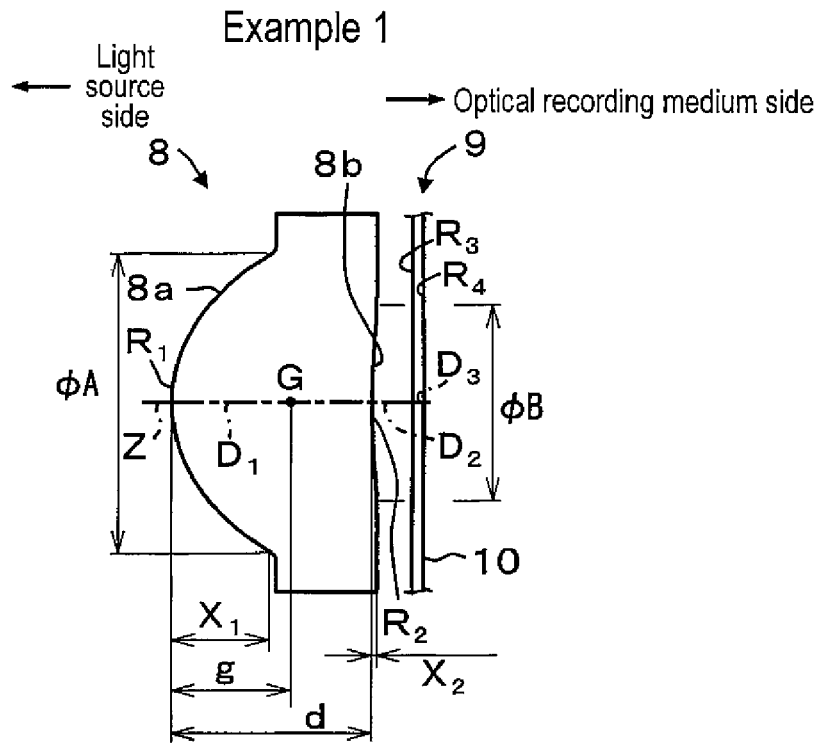
FIG. 1 is a section diagram schematically illustrating an objective lens according to Example 1 of the invention.

Hereinafter, with reference to the accompanying drawings, embodiments of the invention will be described. FIG. 1 is a schematic diagram showing a representative example of an objective lens 8 according to Example 1, in order to explain the configuration of the objective lens for an optical recording medium according to an embodiment of the invention. Furthermore, FIG. 7 is a diagram showing an optical pickup device and the partial configuration of a recording and/or reproducing apparatus for the optical recording medium, and is one exemplary configuration having the objective lens 8 according to this embodiment.

Figure 7:
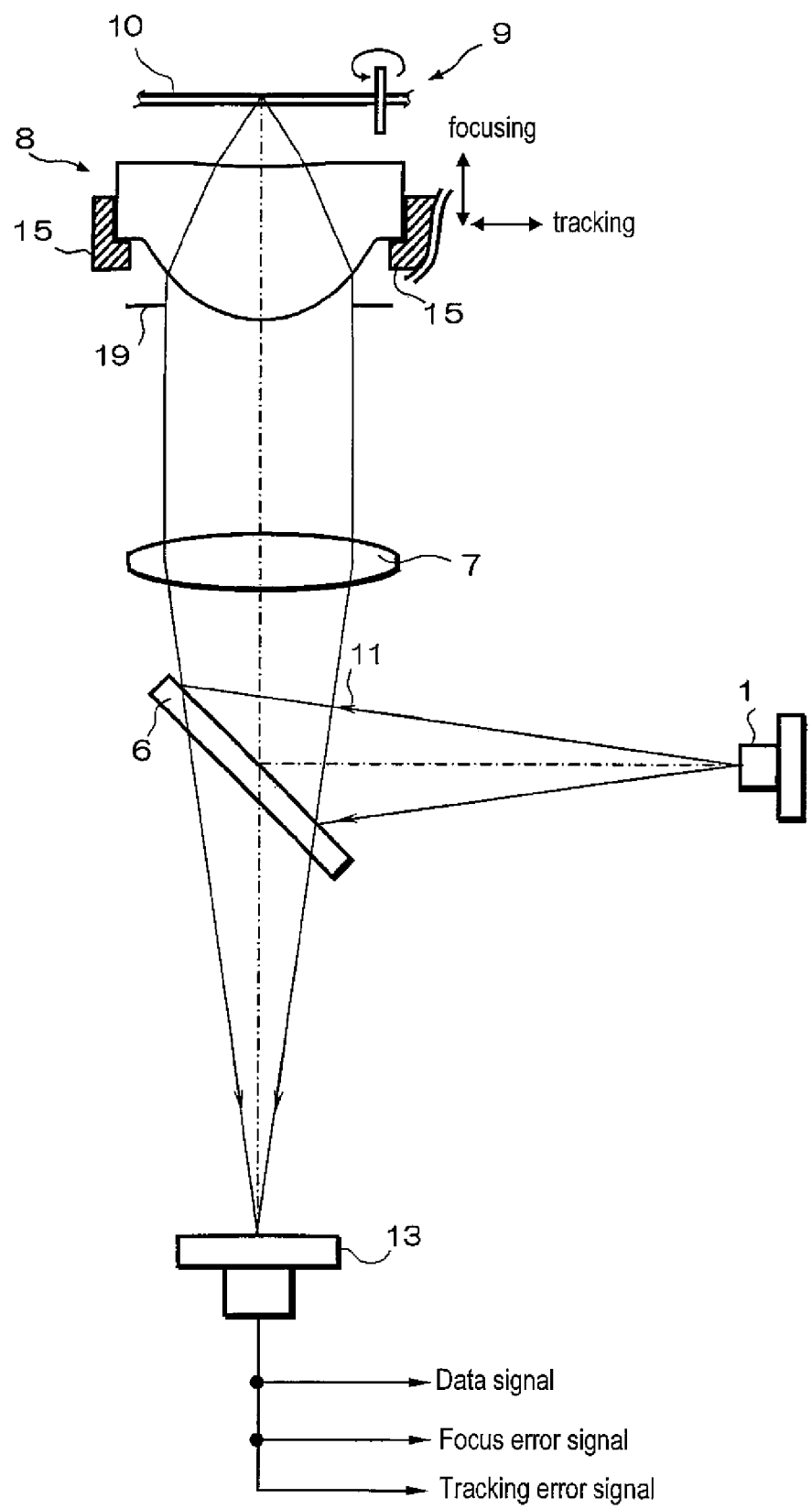
FIG. 7 is a schematic diagram illustrating an optical pickup device (an optical recording medium recording and/or reproducing apparatus) equipped with the objective lens according to an embodiment of the invention.

In the optical pickup device shown in FIG. 7, laser light 11 output from a semiconductor laser 1 is substantially collimated via a half mirror 6 and a collimator lens 7, and is incident on an objective lens 8 for an optical recording medium. Also, the laser light 11 is converted into convergent light by the objective lens 8, and is applied onto an optical recording layer 10 of an optical recording medium 9 (hereinafter, referred to as a blu-ray disc). Furthermore, in order to converge the light onto the optical recording layer 10 satisfactorily, the objective lens 8 performs tracking and focusing by using a servo mechanism including an actuator (which is not shown in the figure). Also, a part of an outer peripheral side flat surface and a light source side flat surface of an edge portion (flange portion) of the objective lens 8 are fixed with an adhesive to a lens holder 15 which is integrally formed with the actuator.

The objective lens 8 is configured to satisfy the following two conditional expressions (1) and (2), and preferably to further satisfy the conditional expression (3)

$$0.70 < NA < 0.98 \quad (1)$$

$$0.50 < g/d < 0.80 \quad (2)$$

$$0.70 < d/f < 3.00 \quad (3)$$

where NA denotes a numerical aperture of the objective lens 8 on an optical recording medium side, d denotes a thickness (mm) of the objective lens 8 on an optical axis, g denotes a distance (mm) from a tangential plane that is perpendicular to the optical axis Z and is tangent to a vertex of a light source side surface 8a of the objective lens 8 to a center of gravity G of the objective lens 8, and f denotes a focal length (mm) of the objective lens 8.

The optical recording medium 9 conforms to the following standard. A numerical aperture NA=0.85 (which can be changed in the range of 0.7<NA<0.98). A wavelength λ of used light=404.7 nm (which can be changed in the range of 405.0±5.0 nm, and for instance, 404.7 nm in Examples 1 to 3; 408.0 nm in Example 4; and 405.0 nm in Examples 5 and 6). A thickness t of a protection layer=0.1 mm (0.1 mm in Examples 1 to 4; and in Examples 5 and 6, the optical recording medium is a double layer disc, and when a thickness t of the protection layer is considered in view of a design for the double layer disc, 0.0875 mm which is a distance from a surface to a position where aberration is minimized is used instead of the thickness of the actual protection layer). In the double layer disc, respective record layers are provided at distances of 0.075 mm and 0.100 mm from the disc surface. In order to compatible with such a disc configuration, the objective lens for the double layer disc is configured so that aberration becomes better in the middle part (which is located at the distance of 0.0875 mm from the surface) between the two record layers. Also, this embodiment of the invention does not exclude the case where the objective lens is used as an objective lens for recording/reproducing information into/from an optical recording medium using other short wavelength light such as a so-called AOD (HD-DVD) disc.

Also, the semiconductor laser 1 is a light source that outputs laser light of a blue wavelength region such as a wavelength of 404.7 nm for use in blu-ray discs.

Also, the collimator lens 7 is just schematically illustrated in FIG. 7, but is not limited to one element configuration. The collimator lens 7 may include plural lens elements.

As described above, a light flux output from the semiconductor laser 1 is incident on a light source side surface 8a of the objective lens 8 in a state of parallel light flux.

Also, by refractive action of the objective lens 8, it is possible to condense exit light flux from an optical recording medium side surface 8b of the objective lens 8 onto the optical recording layer 10, which can record or reproduce information, of the optical recording medium 9.

In the optical recording layer 10, pits (each of which is not necessary to have a concave shape physically) which carry signal information are arranged in a track manner. The reflected light of the laser light 11 from the optical recording layer 10 is incident on the half mirror 6 via the objective lens 8 and the collimator lens 7 in a state where the light carries signal information, and passes through the half mirror 6 to be incident on a four-divided photo diode 13. In the photo diode 13, a light receiving amount of each of the four divided positions of the diode is obtained as an electric signal. Thus, on the basis of the light receiving amounts, a calculation device (not shown in the figure) performs predetermined calculation based on the light receiving amounts, and so it is possible to obtain data signals, an error signal for focusing and an error signal for tracking.

The half mirror 6 is inserted to be inclined at an angle of 45 degrees with respect to an optical path of the returning light from the optical recording medium 9. Therefore, the mirror 6 has the same function as a cylindrical lens, and the light beam transmitted through the half mirror 6 has astigmatism. Thereby, an amount of the focus error is determined in accordance with a shape of a beam spot of the returning light on the four-divided photo diode 13. Also, by inserting a grating between the semiconductor laser 1 and the half mirror 6, it becomes possible to detect a tracking error based on three beams.

The objective lens 8 according to this embodiment consists of a single lens element. As shown in FIG. 1, the light source side surface of the lens is formed into a convex surface having a large curvature, and the optical recording medium side surface of the lens is formed into a surface having a small curvature (this surface is a concave surface in Examples 1 to 3 and 5, and is a convex surface in Examples 4 and 6). As described above, since the objective lens is formed of the single lens element, there is no need to adjust alignment between lenses, during assembly. As a result, it is possible to improve production efficiency and reduce costs.

Also, at least one surface of the objective lens 8 according to this embodiment is formed into an aspheric surface, and it is preferable that the both surfaces of the objective lens 8 be formed into aspheric surfaces. It is more preferable that the aspheric surfaces be formed of aspheric surfaces which is rotationally symmetric and is represented by the following aspherical expression. By forming such a rotationally symmetric aspheric surface, it is possible to satisfactorily correct various aberrations such as spherical aberration and comatic aberration. Thus, it is possible to surely perform the focusing operation and satisfactorily perform the recording and reproducing operations. It is also preferable that the shape of the aspheric surface formed on the objective lens 8 be appropriately set to converge light having a wavelength, which the aspheric surface acts, onto the optical recording layer 10 with aberrations being satisfactory corrected.

$$Z = \frac{C \times Y^2}{1 + \sqrt{1 - K \times C^2 \times Y^2}} + \sum_{i=3}^{20} A_i |Y|^i$$

where Z denotes a length of a perpendicular drawn from a point on the aspheric surface, which is distant Y from the optical axis, to a tangential plane (plane vertical to the optical axis) passing through a vertex of the aspheric surface, Y denote the distance from the optical axis, C denotes a curvature of the aspheric surface near the optical axis, K denotes an eccentricity, and $A_i$ denotes an aspherical coefficient (i=3 to 20).

Furthermore, a mask 19 having an aperture corresponding to the numerical aperture of the optical recording medium 9 is disposed on the light source side of the objective lens 8.

Also, the objective lens 8 may be made of plastic. Exemplary advantages of using a plastic material includes reduction in manufacturing costs, fast recording and reading enabled by reduction in weight, and improvement in processability of a mold.

Furthermore, the objective lens 8 may be made of glass. Exemplary advantages of using a glass material include excellent resistance to temperature and humidity, and ease of acquisition of the material, which has less deterioration in transmittance even when short wavelength light is applied thereto for a long time.

Furthermore, in order to greatly reduce load of the actuator when the focusing operation and the tracking operation are controlled during recording/reproducing of a high density recording medium, it is preferable that a mass of the objective lens 8 is 0.5 grams or less.

As described above, the objective lens 8 according to this embodiment satisfies the conditional expressions (1) to (3). Hereinafter, the technical significance thereof will be described.

First, the conditional expression (1) defines a range of the numerical aperture (NA). That is, the conditional expression (1) is a factor required to achieve recording and reproducing at higher density. Specifically, by setting the large numerical aperture (NA) of 0.70 to 0.98, it is possible to decrease a diameter of a spot condensed onto the optical recording layer 10 of the optical recording medium 9 (blu-ray disk). Thus, even for an optical recording medium which will be newly developed in future, it is possible to achieve higher-density recording and reproducing.

Furthermore, the conditional expression (2) defines that the ratio of the distance g to the thickness d is larger than 0.5 and smaller than 0.8, where d denotes the thickness of the objective lens 8, and g denotes the distance from the tangential plane, which is perpendicular to the optical axis Z and is tangent to the vertex of the light source side surface 8a of the objective lens, to the center of gravity G of the objective lens 8. That is the conditional expression (2) is defined in view of a range that can solve the followings. That is, for the purpose of ensuring the stable operation of the optical pickup apparatus, the center of gravity of the objective lens should not be disposed in a position excessively distant from a middle point of the thickness on the optical axis; the optical pickup objective lens has such a shape that a convex surface having a large curvature is directed toward the light source side, and therefore, unless the center of gravity of the objective lens is set to be in a predetermined range on the optical recording medium side of the middle point of the thickness on the optical axis, it may be hard to secure the stable operation of the optical pickup apparatus depending on the shape of the objective lens, and furthermore, degree of freedom in lens design is greatly restricted. Accordingly, by satisfying the conditional expression (2), it is possible to secure the stable operation of the optical pickup apparatus without deterioration in degree of freedom of lens design.

In addition, the conditional expression (3) is defined under the premise that the conditional expression (1) is satisfied.

Specifically, the conditional expression (3) defines that d/f is greater than 0.70 and smaller than 3.00.

By setting the conditional expression (3) to be in the above range, a preferable condition of the thickness d of the lens on the optical axis and the focal length f thereof for obtaining the good image height characteristic in the single lens element having a large NA is satisfied. Thereby, a thickness of the objective lens 8 is suppressed from becoming excessively large, and components of various aberrations (spherical aberration component, coma aberration component, and the like) in assessing the image height characteristic with a wavefront aberration is suppressed from becoming excessively large. Thus, it is possible to obtain the excellent image height characteristic. Also, since a weight of the lens can be reduced, it becomes possible to drive an actuator for performing the focusing operation and the tracking operation with a small electric power. Thus, it is also possible to satisfactorily secure an operating distance.

The optical pickup device and the recording and/or reproducing apparatus according to this embodiment include the objective lens of this embodiment. Therefore, it is possible to obtain the same effect as the objective lens 8.

Furthermore, by satisfying the following conditional expression (3') instead of the conditional expression (3), the effect mentioned above can be enhanced.

$$0.70 < d/f < 1.40 \tag{3'}$$

Furthermore, in this embodiment, it is preferable that the following conditional expression (4) is satisfied:

$$0.35 < X < 0.80 \tag{4},$$

where NA denotes a numerical aperture of the objective lens 8 on the optical recording medium side,
  d denotes the thickness of the objective lens 8 on the optical axis (mm),
  f denotes a focal length of the objective lens 8 (mm),
  X is equal to $(X1-X2) \cdot (n-1)/(NA \cdot f)$,
  n denotes a refractive index of the objective lens 8 at a wavelength of the used light,
  X1 denotes a distance, in mm and in an optical axis direction, between the first tangential plane and a most outside position within an effective diameter of the light source side surface, which is a position on the light source side surface on which a marginal ray having the NA is incident, and X1 is defined so that a direction toward the optical recording medium from the first tangential plane serving as a reference point is a positive direction and that a direction toward the light source from the first tangential plane is a negative direction, and
  X2 is a distance, in mm and in the optical axis direction, between (a) a second tangential plane that is perpendicular to the optical axis and is tangent to a vertex of an optical recording medium side surface and (b) a most outside position within an effective diameter of the optical recording medium side surface, which is a position on the optical recording medium side surface on which the marginal ray having the NA is incident, and X2 is defined so that a direction toward the optical recording medium from the second tangential plane serving as a reference point is a positive direction and a direction toward the light source from the second tangential plane is a negative direction.

Also, the conditional expression (4) is set so that X (=$(X1-X2) \cdot (n-1)/(NA \cdot f)$) is greater than 0.35 and smaller than 0.80.

That is, the conditional expression (4) is defined to satisfactory correct a spherical aberration in the single lens element having the high NA of 0.70 to 0.98, and relates to a sag amount of the light source side surface and a sag amount of the optical recording medium side surface. (i) as an absolute value of X1 decreases when X1 takes a positive value, (ii) as an absolute value of X2 decreases when X2 takes a negative value, or (iii) as an absolute value of X2 increases when X2 takes a positive value, correction of the spherical aberration caused by a marginal ray becomes excessive. In contrast, (i) as an absolute value of X1 increases when X1 takes a positive value, (ii) as an absolute value of X2 increases when X2 takes a negative value, or (iii) as an absolute value of X2 decreases when X2 takes a positive value, correction of the spherical aberration caused by the marginal ray becomes insufficient. In order to satisfactorily correct the spherical aberration of the single lens element having the high NA of 0.70 to 0.98, X should be set to be greater than 0.35 and smaller than 0.80.

In the objective lens according to this embodiment, by satisfying the conditional expression (4), it is possible to improve the spherical aberration not only in a high NA single lens for blu-ray disks but also in a higher-NA single objective lens 8 which will be developed in future.

As described above, considering a peculiar shape of the objective lens 8, an absolute value of X1 is quite greater than that of X2. Therefore, a magnitude of X1−X2 greatly depends on a magnitude of X1. Accordingly, excessive increase in a value of X technically means excessive increase in curvature of the light source side surface, and leads to deterioration in mold separation during molding of a lens. The upper limit of the conditional expression (4) is defined in consideration of a value at which the mold separation during molding does not deteriorate. Meanwhile, when X reaches or falls below the lower limit of the conditional expression (4), in the case of high NA, the spherical aberration is excessively corrected. Accordingly, by satisfying the conditional expression (4), it is possible to perform better mold separation during molding while achieving excellent optical performance.

Furthermore, by satisfying the following conditional expression (4') instead of the conditional expression (4), the effect mentioned above can be enhanced.

$$0.48 < X < 0.55 \tag{4'}$$

Furthermore, in this embodiment, it is preferable that the following conditional expression (5) is satisfied:

$$1.0 \leq \Phi A \leq 5.0 \tag{5},$$

where ΦA denotes the effective diameter of the light source side surface of the objective lens 8.

If ΦA falls below the lower limit of the conditional expression (5), a size of the lens becomes too small. Thus, manufacturability thereof becomes extremely worse. In contrast, if ΦA exceeds the upper limit of the conditional expression (5), it is hard to meet the demand of reduction in weight and compactness.

Furthermore, in this embodiment, it is preferable that the following conditional expression (6) is satisfied:

$$0.25 < Y < 0.65 \tag{6}$$

where Y is equal to $R1/(n \cdot f)$, and
  R1 denotes a radius of curvature of the light source side surface of the objective lens 8 near the optical axis.

The conditional expression (6) is a conditional expression for satisfactorily correcting a coma aberration component of the image height characteristic. If Y is out of the range of the conditional expression (6), an absolute value of quantity which does not satisfy a sine condition. Thus, it is hard to satisfactorily correct the coma aberration component of the image height characteristics.

Also, in this embodiment, it is preferable that the following conditional expression (7) be satisfied:

$$0.075 \leq t1 \leq 0.1 \tag{7},$$

where t1 denotes a distance from the lens side surface of the optical recording medium to a position inside the medium where aberration is minimized.

When the record layers of a double layer disc are provided in positions, which are distant 0.075 mm and 0.100 mm from the lens side surface to the inside of the medium, respectively, the conditional expression (7) serves as a conditional expression for forming a fine image on both of the record layer positions. If t1 is out of the range of the conditional expression (7), although an image formed in one recording surface position of the two record layers is fine, an image formed in the other recording surface position deteriorates. Thus, imaging states of the two surfaces become greatly different.

Furthermore, in order to improve an image formation state in each recording surface position, for example, the optical pickup device may have an aberration correction unit for performing adjustment by shifting the lens in the optical axis direction. In this case, the conditional expression (7) also serves as a conditional expression for decreasing a load applied to the optical pickup device such as a lens shift distance for correcting aberration. Because of this, it is possible to shorten a time for aberration correction.

Hereinafter, the objective lenses according to the embodiment will be described in detail with reference to Examples.

EXAMPLE

Example 1

The objective lens 8 according to Example 1 consists of a single lens element made of glass. As shown in FIG. 1, the light source side surface 8a is formed into a convex surface having a large curvature, and the optical recording medium side surface 8b is formed into a concave surface (on the optical axis) having a small curvature.

Also, the both surfaces of the objective lens 8 according to Example 1 are formed into aspheric surfaces.

The objective lens 8 is set to have a numerical aperture NA of 0.85 at the used light having a wavelength λ of 404.7 nm, and satisfactory converges the light onto the optical recording layer 10 of the optical recording medium (blu-ray disc) 9. Also, the thickness t of the protection layer of the optical recording medium 9 is set to be 0.1000 mm.

The upper part of the following Table 1 shows the following items as specific values of lens data of the objective lens 8 according to Example 1: the radius of curvature R (mm); the surface spacing D (mm); and the refractive index N at the light having the wavelength λ. Furthermore, numerals corresponding to the radius of curvature R, the surface spacing D, and the refractive index N are arranged in ascending order from the light source side (this is similarly applied to Examples 2 to 6).

Furthermore, the middle part of the following Table 1 shows the aspherical coefficients C, K, and $A_3$ to $A_{20}$ of the rotationally symmetric aspheric surfaces of the objective lens 8 according to Example 1 (this is similarly applied to Examples 2 to 6).

In addition, the lower part of the following Table 1 shows the following items at the used light having the wavelength λ when the optical recording medium 9 is set: the following items are represented: the focal length f (mm); the back focal length bf (mm); the lens thickness d on the optical axis (mm); the protection layer thickness t (mm); the distance g on the optical axis Z from the light side surface 8a and the center of gravity G (mm); a mass (gram); and the effective diameters ΦA and ΦB (mm) of the respective surfaces (the light source side surface 8a is referred to as a first surface, and the optical recording medium side surface 8b is referred to as a second surface: the same is applied to the following Examples) of the objective lens 8 according to Example 1 (these are similarly applied to Examples 2 to 6).

TABLE 1

| Wavelength λ (nm) | | 404.7 | |
|---|---|---|---|
| NA | | 0.85 | |
| Surface | Curvature radius R (mm) | Surface separating D (mm) | Refractive index N |
| 1 | Aspheric surface | 2.660 | 1.83845 |
| 2 | Aspheric surface | 0.699 | 1.00000 |
| 3 | ∞ | 0.100 | 1.52977 |
| 4 | ∞ | | |

| Coefficients of aspheric surface expression | | |
|---|---|---|
| | 1st surface | 2nd surface |
| C | 0.548674175 | 0.080574297 |
| K | $-1.061479418 \times 10^{-3}$ | $-5.611340754 \times 10^{-2}$ |
| $A_3$ | 0.000000000 | 0.000000000 |
| $A_4$ | $1.270519830 \times 10^{-2}$ | $3.758299557 \times 10^{-2}$ |
| $A_5$ | 0.000000000 | 0.000000000 |
| $A_6$ | $1.030368124 \times 10^{-3}$ | $-4.376347500 \times 10^{-2}$ |
| $A_7$ | 0.000000000 | 0.000000000 |
| $A_8$ | $1.005409026 \times 10^{-4}$ | $1.130434946 \times 10^{-2}$ |
| $A_9$ | 0.000000000 | 0.000000000 |
| $A_{10}$ | $1.242029162 \times 10^{-5}$ | $3.806010944 \times 10^{-3}$ |
| $A_{11}$ | 0.000000000 | 0.000000000 |
| $A_{12}$ | $-1.326556943 \times 10^{-5}$ | $-1.580726242 \times 10^{-3}$ |
| $A_{13}$ | 0.000000000 | 0.000000000 |
| $A_{14}$ | $5.942473430 \times 10^{-6}$ | $-8.143251324 \times 10^{-4}$ |
| $A_{15}$ | 0.000000000 | 0.000000000 |
| $A_{16}$ | $-1.274070855 \times 10^{-6}$ | $3.437625596 \times 10^{-4}$ |
| $A_{17}$ | 0.000000000 | 0.000000000 |
| $A_{18}$ | 0.000000000 | 0.000000000 |
| $A_{19}$ | 0.000000000 | 0.000000000 |
| $A_{20}$ | 0.000000000 | 0.000000000 |

| | |
|---|---|
| Focal length f (mm) | 2.2860 |
| Back focal length bf (mm) | 0.7644 |
| Lens thickness on optical axis d (mm) | 2.660 |
| Protection layer thickness t (mm) | 0.100 |
| Position of center of gravity g (mm) | 1.592 |
| Mass (gram) | 0.160 |
| Effective diameter of 1st surface ΦA (mm) | 3.8862 |
| Effective diameter of 2nd surface ΦB (mm) | 2.2337 |

Figure 8:
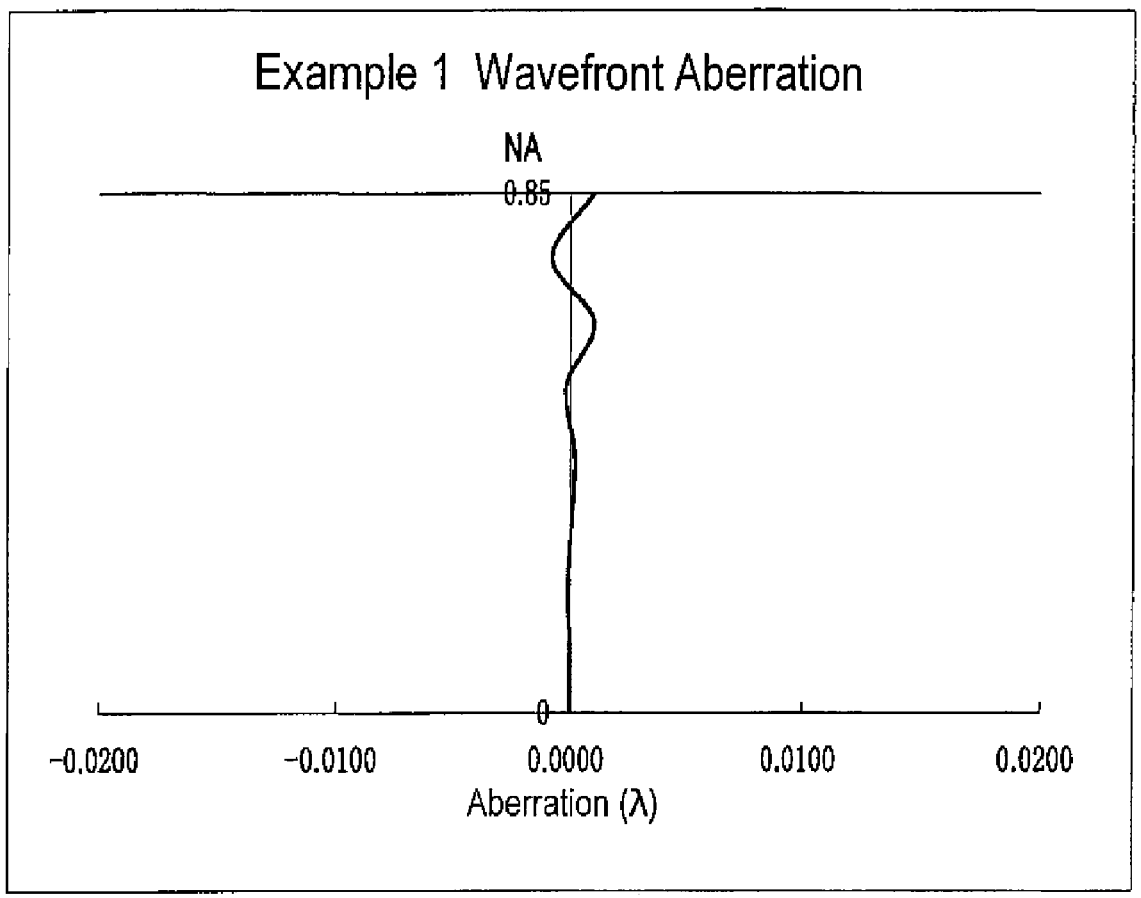
FIG. 8 is a diagram illustrating wavefront aberration in the objective lens according to Example 1 of the invention.

Furthermore, FIG. 8 shows a wavefront aberration curve of the objective lens 8 according to Example 1 at the used light having the wavelength λ when the optical recording medium 9 is set.

As shown in FIG. 8, it is clearly observed that the wavefront aberration is good.

As shown in Table 7, the objective lens 8 according to Example 1 satisfies all the conditional expressions (1) to (7) (including the conditional expressions (3') and (4')).

Example 2

Figure 2:
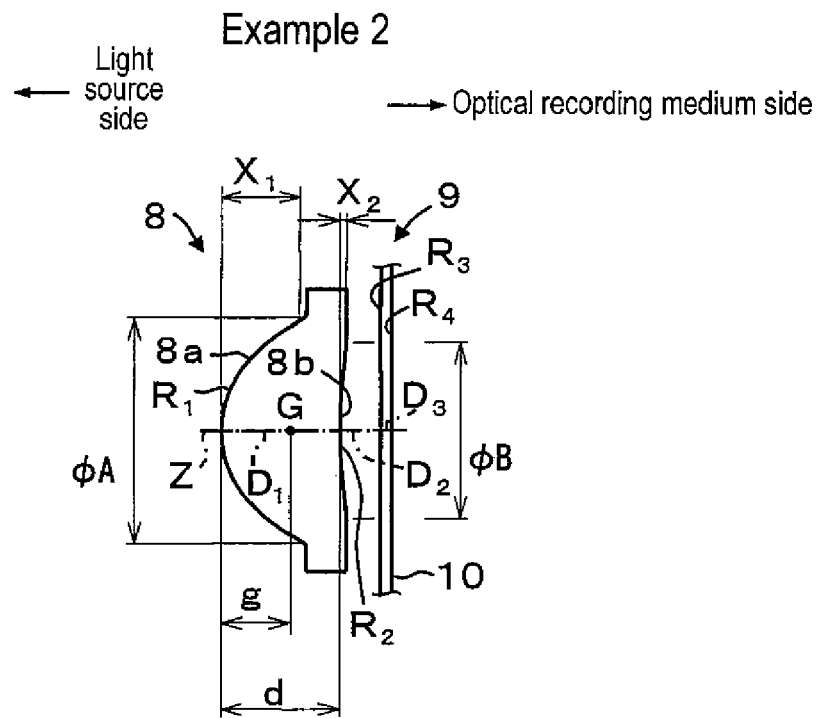
FIG. 2 is a section diagram schematically illustrating an objective lens according to Example 2 of the invention.

The objective lens 8 according to Example 2 consists of a single lens element made of glass. As shown in FIG. 2, the light source side surface 8a is formed into a convex surface having a large curvature, and the optical recording medium side surface 8b is formed into a concave surface (on the optical axis) having a small curvature.

Furthermore, the both surfaces of the objective lens 8 according to Example 2 are formed into aspheric surfaces.

The objective lens 8 is set to have a numerical aperture NA of 0.85 at the used light having a wavelength λ of 404.7 nm, and satisfactory converges the light onto the optical recording layer 10 of the optical recording medium (blu-ray disc) 9. Also, the thickness t of the protection layer of the optical recording medium 9 is set to be 0.1000 mm.

The upper part of the following Table 2 shows the following items as specific values of lens data of the objective lens 8 according to Example 2: the radius of curvature R (mm); the surface spacing D (mm); and the refractive index N at the light having the wavelength λ.

TABLE 2

| Wavelength λ (nm) | | 404.7 | |
|---|---|---|---|
| NA | | 0.85 | |
| Surface | Curvature radius R (mm) | Surface separating D (mm) | Refractive index N |
| 1 | Aspheric surface | 1.700 | 1.83845 |
| 2 | Aspheric surface | 0.699 | 1.00000 |
| 3 | ∞ | 0.100 | 1.62000 |
| 4 | ∞ | | |

| Coefficients of aspheric surface expression | | |
|---|---|---|
| | 1st surface | 2nd surface |
| C | 0.732117631 | 0.125960246 |
| K | $-9.410836299 \times 10^{-3}$ | $-5.574710819 \times 10^{-2}$ |
| $A_3$ | 0.000000000 | 0.000000000 |
| $A_4$ | $3.155998109 \times 10^{-2}$ | $7.198972260 \times 10^{-2}$ |
| $A_5$ | 0.000000000 | 0.000000000 |
| $A_6$ | $4.536801330 \times 10^{-3}$ | $-1.151590934 \times 10^{-1}$ |
| $A_7$ | 0.000000000 | 0.000000000 |
| $A_8$ | $1.568451724 \times 10^{-3}$ | $6.609235017 \times 10^{-2}$ |
| $A_9$ | 0.000000000 | 0.000000000 |
| $A_{10}$ | $-1.079042478 \times 10^{-3}$ | $-1.051916599 \times 10^{-2}$ |
| $A_{11}$ | 0.000000000 | 0.000000000 |
| $A_{12}$ | $7.314946183 \times 10^{-4}$ | $-7.740024206 \times 10^{-3}$ |
| $A_{13}$ | 0.000000000 | 0.000000000 |
| $A_{14}$ | $-2.275254057 \times 10^{-4}$ | $3.968648120 \times 10^{-3}$ |
| $A_{15}$ | 0.000000000 | 0.000000000 |
| $A_{16}$ | $-4.184944709 \times 10^{-6}$ | $-5.217266041 \times 10^{-4}$ |
| $A_{17}$ | 0.000000000 | 0.000000000 |
| $A_{18}$ | 0.000000000 | 0.000000000 |
| $A_{19}$ | 0.000000000 | 0.000000000 |
| $A_{20}$ | 0.000000000 | 0.000000000 |

| Focal length f (mm) | 1.7600 |
|---|---|
| Back focal length bf (mm) | 0.7610 |
| Lens thickness on optical axis d (mm) | 1.700 |
| Protection layer thickness t (mm) | 0.100 |
| Position of center of gravity g (mm) | 1.059 |
| Mass (gram) | 0.056 |
| Effective diameter of 1st surface φA (mm) | 2.9920 |
| Effective diameter of 2nd surface φB (mm) | 2.1003 |

Figure 9:
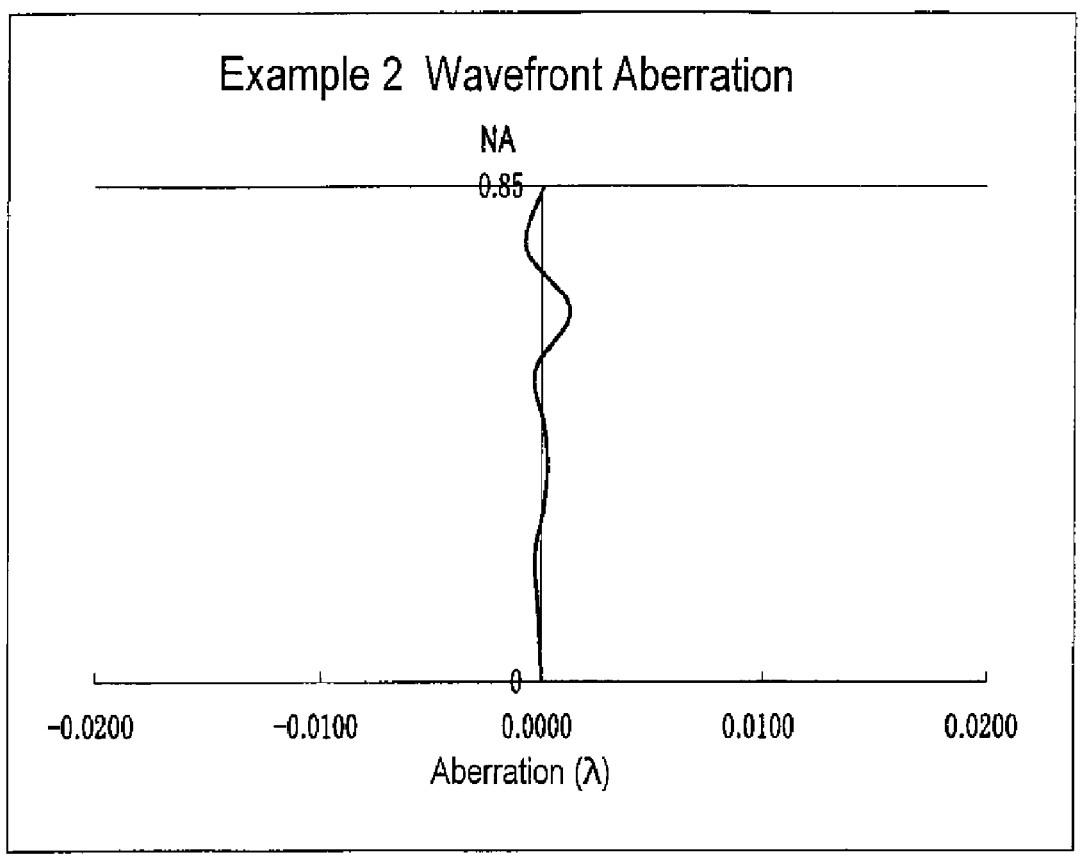
FIG. 9 is a diagram illustrating wavefront aberration in the objective lens according to Example 2 of the invention.

Furthermore, FIG. 9 shows a wavefront aberration curve of the objective lens 8 according to Example 2 at the used light having the wavelength λ when the optical recording medium 9 is set.

As shown in FIG. 9, it is clearly observed that the wavefront aberration is good.

As shown in Table 7, the objective lens 8 according to Example 2 satisfies all the conditional expressions (1) to (7) (including the conditional expressions (3') and (4')).

Example 3

Figure 3:
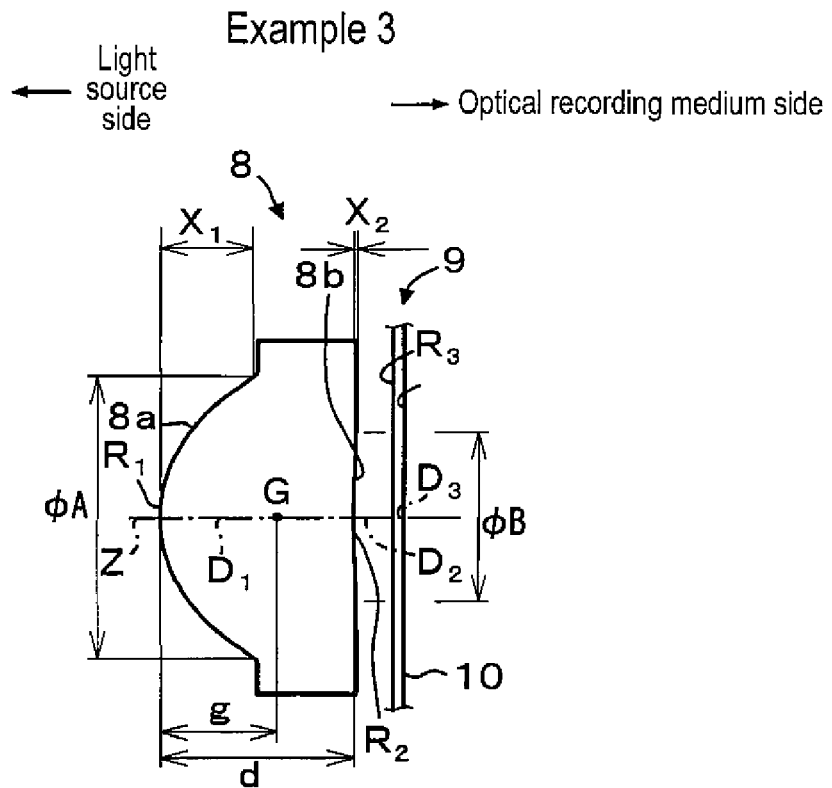
FIG. 3 is a section diagram schematically illustrating an objective lens according to Example 3 of the invention.

The objective lens 8 according to Example 3 consists of a single lens element made of glass. As shown in FIG. 3, the light source side surface 8a is formed into a convex surface having a large curvature, and the optical recording medium side surface 8b is formed into a concave surface (on the optical axis) having a small curvature.

Furthermore, the both surfaces of the objective lens 8 according to Example 3 are formed into aspheric surfaces.

The objective lens 8 is set to have a numerical aperture NA of 0.85 at the used light having a wavelength λ of 404.7 nm, and satisfactory converges the light onto the optical recording layer 10 of the optical recording medium (blu-ray disc) 9.

Also, the thickness t of the protection layer of the optical recording medium 9 is set to be 0.1000 mm.

The upper part of the following Table 3 shows the following items as specific values of lens data of the objective lens 8 according to Example 3: the radius of curvature R (mm); the surface spacing D (mm); and the refractive index N at the light having the wavelength λ.

TABLE 3

| Wavelength λ (nm) | | 404.7 | |
|---|---|---|---|
| NA | | 0.85 | |
| Surface | Curvature radius R (mm) | Surface separating D (mm) | Refractive index N |
| 1 | Aspheric surface | 2.210 | 1.83845 |
| 2 | Aspheric surface | 0.475 | 1.00000 |
| 3 | ∞ | 0.100 | 1.62000 |
| 4 | ∞ | | |

| Coefficients of aspheric surface expression | | |
|---|---|---|
| | 1st surface | 2nd surface |
| C | 0.689630774 | 0.039276841 |
| K | $-8.688889711 \times 10^{-3}$ | $-5.619160401 \times 10^{-2}$ |
| $A_3$ | 0.000000000 | 0.000000000 |
| $A_4$ | $2.569152680 \times 10^{-2}$ | $1.630668463 \times 10^{-1}$ |
| $A_5$ | 0.000000000 | 0.000000000 |
| $A_6$ | $2.943292477 \times 10^{-3}$ | $-3.557924631 \times 10^{-1}$ |
| $A_7$ | 0.000000000 | 0.000000000 |
| $A_8$ | $1.573660098 \times 10^{-3}$ | $2.181733794 \times 10^{-1}$ |
| $A_9$ | 0.000000000 | 0.000000000 |
| $A_{10}$ | $-1.458312707 \times 10^{-3}$ | $1.191817126 \times 10^{-1}$ |
| $A_{11}$ | 0.000000000 | 0.000000000 |
| $A_{12}$ | $9.914170566 \times 10^{-4}$ | $-1.230552513 \times 10^{-1}$ |
| $A_{13}$ | 0.000000000 | 0.000000000 |
| $A_{14}$ | $-3.190780605 \times 10^{-4}$ | $-1.298144710 \times 10^{-1}$ |
| $A_{15}$ | 0.000000000 | 0.000000000 |
| $A_{16}$ | $1.869168441 \times 10^{-5}$ | $1.211246037 \times 10^{-1}$ |
| $A_{17}$ | 0.000000000 | 0.000000000 |
| $A_{18}$ | 0.000000000 | 0.000000000 |
| $A_{19}$ | 0.000000000 | 0.000000000 |
| $A_{20}$ | 0.000000000 | 0.000000000 |

| Focal length f (mm) | 1.7600 |
|---|---|
| Back focal length bf (mm) | 0.5367 |
| Lens thickness on optical axis d (mm) | 2.210 |
| Protection layer thickness t (mm) | 0.100 |
| Position of center of gravity g (mm) | 1.312 |
| Mass (gram) | 0.086 |
| Effective diameter of 1st surface φA (mm) | 2.9920 |
| Effective diameter of 2nd surface φB (mm) | 1.5624 |

Figure 10:
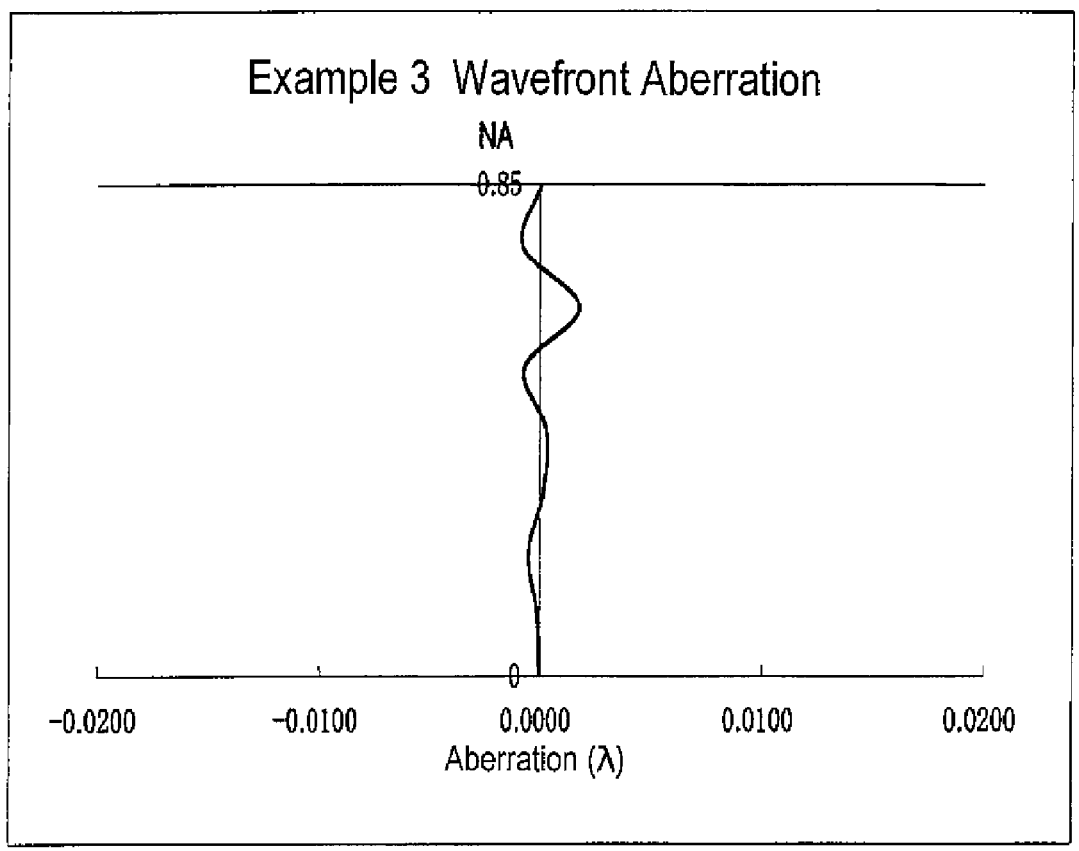
FIG. 10 is a diagram illustrating wavefront aberration in the objective lens according to Example 3 of the invention.

Furthermore, FIG. 10 shows a wavefront aberration curve of the objective lens 8 according to Example 3 at the used light having the wavelength λ when the optical recording medium 9 is set.

As shown in FIG. 10, it is clearly observed that the wavefront aberration is good.

As shown in Table 7, the objective lens 8 according to Example 3 satisfies all the conditional expressions (1) to (7) (including the conditional expressions (3') and (4')).

Example 4

Figure 4:
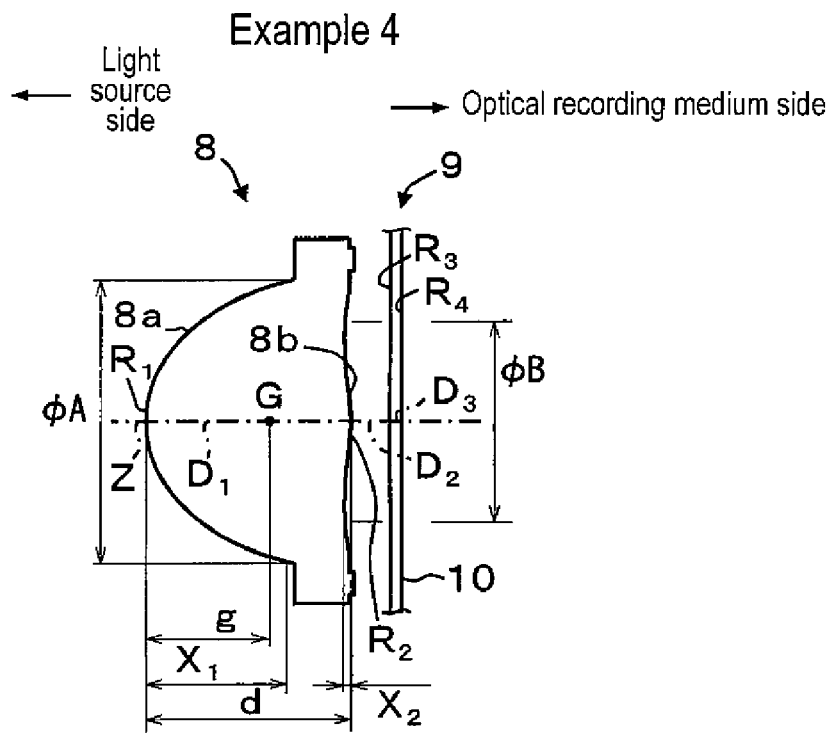
FIG. 4 is a section diagram schematically illustrating an objective lens according to Example 4 of the invention.

The objective lens 8 according to Example 4 consists of a single lens element made of plastic. As shown in FIG. 4, the light source side surface 8a is formed into a convex surface having a large curvature, and the optical recording medium side surface 8b is formed into a convex surface (on the optical axis) having a small curvature.

Furthermore, the both surfaces of the objective lens 8 according to Example 4 are formed into aspheric surfaces.

The objective lens 8 is set to have a numerical aperture NA of 0.85 at the used light having a wavelength λ of 408.0 nm, and satisfactory converges the light onto the optical recording layer 10 of the optical recording medium (blu-ray disc) 9. Also, the thickness t of the protection layer of the optical recording medium 9 is set to be 0.1000 mm.

The upper part of the following Table 4 shows the following items as specific values of lens data of the objective lens 8 according to Example 4: the radius of curvature R (mm); the surface spacing D (mm); and the refractive index N at the light having the wavelength λ.

TABLE 4

| | Wavelength λ (nm) | 408 | |
| | NA | 0.85 | |

| Surface | Curvature radius R (mm) | Surface separating D (mm) | |
|---|---|---|---|
| 1 | Aspheric surface | 2.253 | 1.52522 |
| 2 | Aspheric surface | 0.502 | 1.00000 |
| 3 | ∞ | 0.100 | 1.61786 |
| 4 | ∞ | | |

| Coefficients of aspheric surface expression | | |
|---|---|---|
| | 1st surface | 2nd surface |
| C | 0.877164470 | −0.630277255 |
| K | $4.496547921 \times 10^{-2}$ | 1.524018153 |
| $A_3$ | 0.000000000 | 0.000000000 |
| $A_4$ | $3.823031376 \times 10^{-2}$ | $8.778900757 \times 10^{-1}$ |
| $A_5$ | 0.000000000 | 0.000000000 |
| $A_6$ | $3.518063967 \times 10^{-3}$ | −1.557286522 |
| $A_7$ | 0.000000000 | 0.000000000 |
| $A_8$ | $1.858860704 \times 10^{-2}$ | 1.879314685 |
| $A_9$ | 0.000000000 | 0.000000000 |
| $A_{10}$ | $-2.594878831 \times 10^{-2}$ | −1.370939101 |
| $A_{11}$ | 0.000000000 | 0.000000000 |
| $A_{12}$ | $2.385687100 \times 10^{-2}$ | 1.300798787 |
| $A_{13}$ | 0.000000000 | 0.000000000 |
| $A_{14}$ | $-1.122473371 \times 10^{-2}$ | −2.270369528 |
| $A_{15}$ | 0.000000000 | 0.000000000 |
| $A_{16}$ | $2.344349476 \times 10^{-3}$ | 2.611797039 |
| $A_{17}$ | 0.000000000 | 0.000000000 |
| $A_{18}$ | $-8.484603101 \times 10^{-5}$ | −1.482269017 |
| $A_{19}$ | 0.000000000 | 0.000000000 |
| $A_{20}$ | $-8.752092239 \times 10^{-6}$ | $3.299435201 \times 10^{-1}$ |

| Focal length f (mm) | 1.7654 |
|---|---|
| Back focal length bf (mm) | 0.5640 |
| Lens thickness on optical axis d (mm) | 2.253 |
| Protection layer thickness t (mm) | 0.100 |
| Position of center of gravity g (mm) | 1.333 |
| Mass (gram) | 0.015 |
| Effective diameter of 1st surface φA (mm) | 3.0011 |
| Effective diameter of 2nd surface φB (mm) | 1.9632 |

Figure 11:
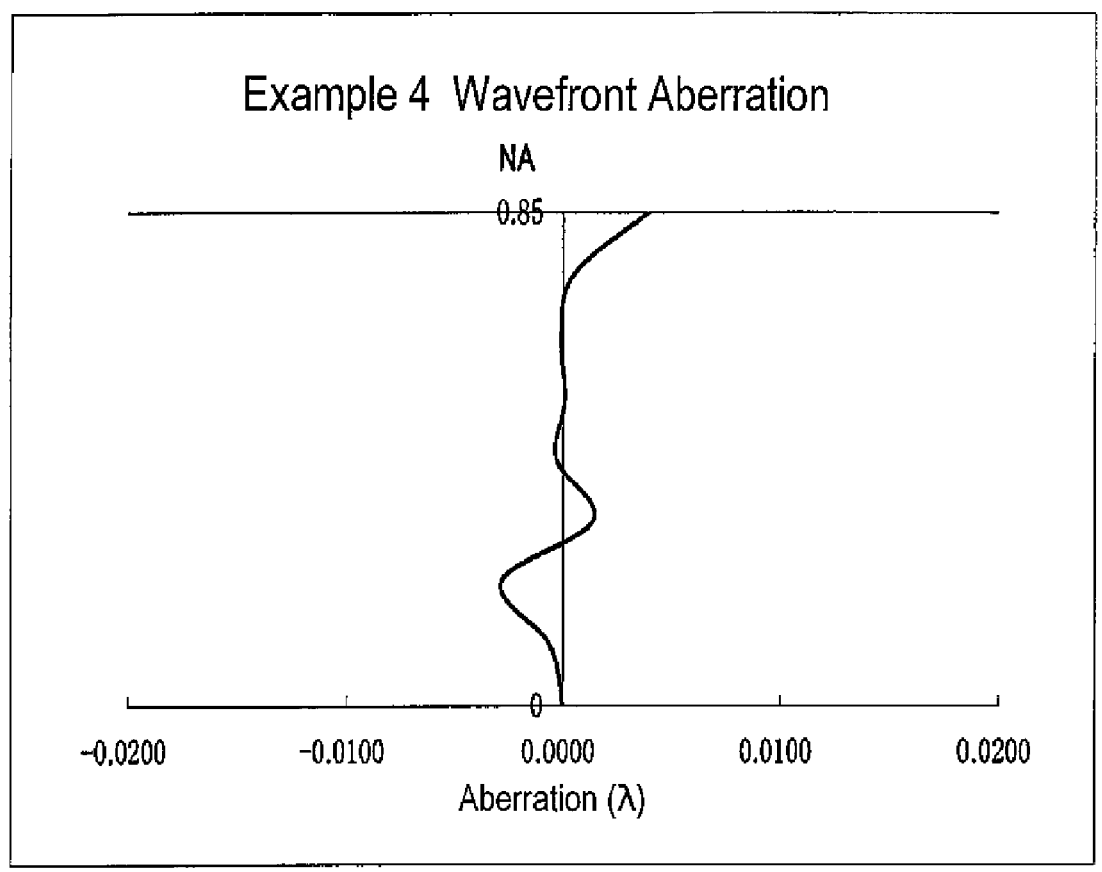
FIG. 11 is a diagram illustrating wavefront aberration in the objective lens according to Example 4 of the invention.

Furthermore, FIG. 11 shows a wavefront aberration curve of the objective lens 8 according to Example 4 at the used light having the wavelength λ when the optical recording medium 9 is set.

As shown in FIG. 11, it is clearly observed that the wavefront aberration is good.

As shown in Table 7, the objective lens 8 according to Example 4 satisfies all the conditional expressions (1) to (7) (including the conditional expressions (3') and (4')).

Example 5

Figure 5:
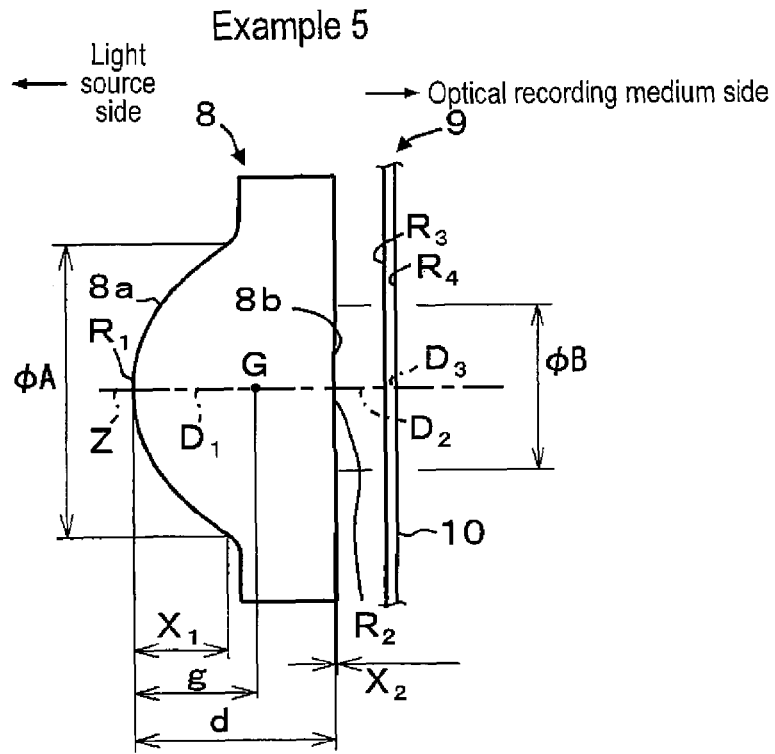
FIG. 5 is a section diagram schematically illustrating an objective lens according to Example 5 of the invention.

The objective lens 8 according to Example 5 consists of a single lens element made of glass. As shown in FIG. 5, the light source side surface 8a is formed into a convex surface having a large curvature, and the optical recording medium side surface 8b is formed into a concave surface (on the optical axis) having a small curvature.

Furthermore, the both surfaces of the objective lens 8 according to Example 5 are formed into aspheric surfaces.

The objective lens 8 is set to have a numerical aperture NA of 0.85 at the used light having a wavelength λ of 405.0 nm, and satisfactory converges the light onto the optical recording layer 10 of the optical recording medium (blu-ray disc) 9. Also, the optical recording medium 9 is a double layer disc. When a thickness t of the protection layer is considered in view of a design for the double layer disc, 0.0875 mm which is a distance from a surface to a position where aberration is minimized is used.

The upper part of the following Table 5 shows the following items as specific values of lens data of the objective lens 8 according to Example 5: the radius of curvature R (mm); the surface spacing D (mm); and the refractive index N at the light having the wavelength λ.

TABLE 5

| | Wavelength λ (nm) | 405 | |
| | NA | 0.85 | |

| Surface | Curvature radius R (mm) | Surface separating D (mm) | |
|---|---|---|---|
| 1 | Aspheric surface | 1.470 | 1.83833 |
| 2 | Aspheric surface | 0.318 | 1.00000 |
| 3 | ∞ | 0.0875 | 1.61900 |
| 4 | ∞ | | |

| Coefficients of aspheric surface expression | | |
|---|---|---|
| | 1st surface | 2nd surface |
| C | 1.020043332 | 0.018068790 |
| K | $2.619137643 \times 10^{-2}$ | −4.998689364 |
| $A_3$ | $-1.636212462 \times 10^{-3}$ | $-1.058609924 \times 10^{-2}$ |
| $A_4$ | $8.702680781 \times 10^{-2}$ | $5.322862004 \times 10^{-1}$ |
| $A_5$ | $-1.007631900 \times 10^{-2}$ | $-2.855879205 \times 10^{-1}$ |
| $A_6$ | $-3.872665379 \times 10^{-2}$ | $-2.740661807 \times 10^{-1}$ |
| $A_7$ | $1.389458414 \times 10^{-1}$ | −2.757875038 |
| $A_8$ | $1.309803469 \times 10^{-2}$ | −2.808922015 |
| $A_9$ | $-1.271309360 \times 10^{-1}$ | 1.959877807 |
| $A_{10}$ | $-9.619290977 \times 10^{-2}$ | $1.749121483 \times 10$ |
| $A_{11}$ | $6.260776506 \times 10^{-2}$ | $2.589541494 \times 10$ |
| $A_{12}$ | $1.516934152 \times 10^{-1}$ | −7.605743196 |
| $A_{13}$ | $1.467006948 \times 10^{-1}$ | $-7.440033486 \times 10$ |
| $A_{14}$ | $-1.522983345 \times 10^{-1}$ | $-8.297958500 \times 10$ |
| $A_{15}$ | $-2.812044935 \times 10^{-1}$ | $-3.452097139 \times 10$ |
| $A_{16}$ | $2.010179246 \times 10^{-1}$ | $2.651724208 \times 10^{2}$ |
| $A_{17}$ | 0.000000000 | 0.000000000 |
| $A_{18}$ | 0.000000000 | 0.000000000 |
| $A_{19}$ | 0.000000000 | 0.000000000 |
| $A_{20}$ | 0.000000000 | 0.000000000 |

| Focal length f (mm) | 1.1760 |
|---|---|
| Back focal length bf (mm) | 0.3718 |
| Lens thickness on optical axis d (mm) | 1.470 |
| Protection layer thickness t (mm) | 0.0875 |
| Position of center of gravity g (mm) | 0.892 |
| Mass (gram) | 0.031 |
| Effective diameter of 1st surface φA (mm) | 1.9992 |
| Effective diameter of 2nd surface φB (mm) | 1.0898 |

Figure 12:
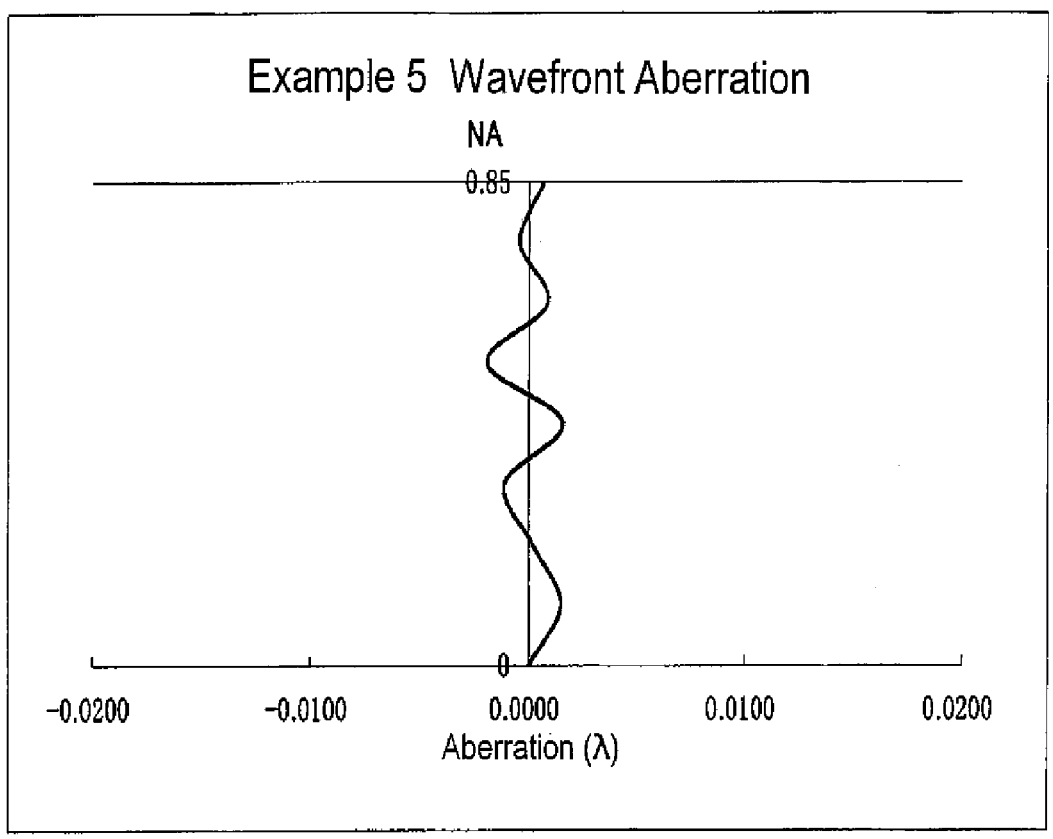
FIG. 12 is a diagram illustrating wavefront aberration in the objective lens according to Example 5 of the invention.

Furthermore, FIG. 12 shows a wavefront aberration curve of the objective lens 8 according to Example 5 at the used light having the wavelength λ when the optical recording medium 9 is set.

As shown in FIG. 12, it is clearly observed that the wavefront aberration is good.

As shown in Table 7, the objective lens 8 according to Example 5 satisfies all the conditional expressions (1) to (7) (including the conditional expressions (3') and (4')).

Example 6

Figure 6:
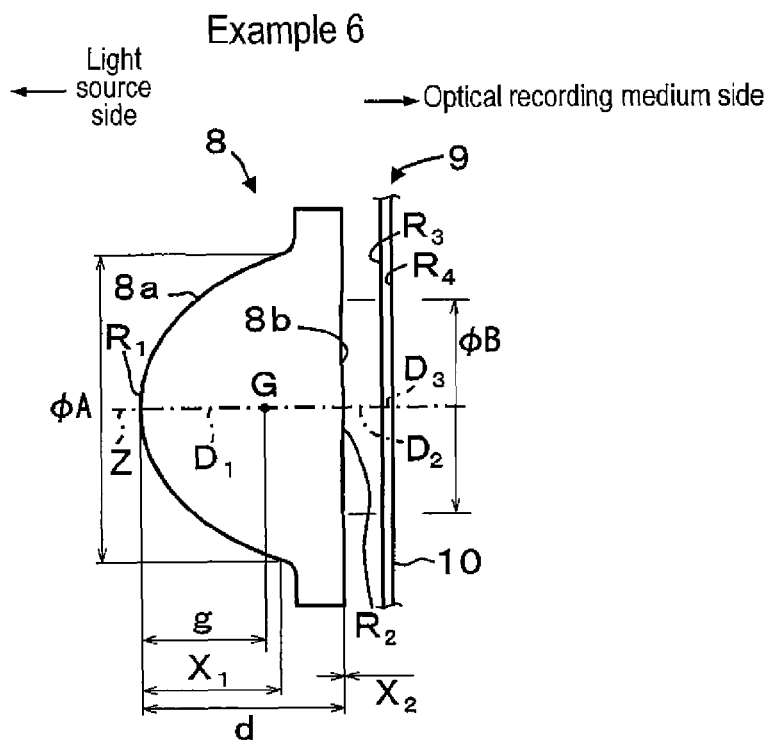
FIG. 6 is a section diagram schematically illustrating an objective lens according to Example 6 of the invention.

The objective lens 8 according to Example 6 consists of a single lens element made of glass. As shown in FIG. 6, the light source side surface 8a is formed into a convex surface having a large curvature, and the optical recording medium side surface 8b is formed into a convex surface (on the optical axis) having a small curvature.

Furthermore, the both surfaces of the objective lens 8 according to Example 6 are formed into aspheric surfaces.

The objective lens 8 is set to have a numerical aperture NA of 0.85 at the used light having a wavelength λ of 405.0 nm, and satisfactorily converges the light onto the optical recording layer 10 of the optical recording medium (blu-ray disc) 9. Also, the optical recording medium 9 is a double layer disc. When a thickness t of the protection layer is considered in view of a design for the double layer disc, 0.0875 mm which is a distance from a surface to a position where aberration is minimized is used.

The upper part of the following Table 6 shows the following items as specific values of lens data of the objective lens 8 according to Example 6: the radius of curvature R (mm); the surface spacing D (mm); and the refractive index N at the light having the wavelength λ.

Figure 13:
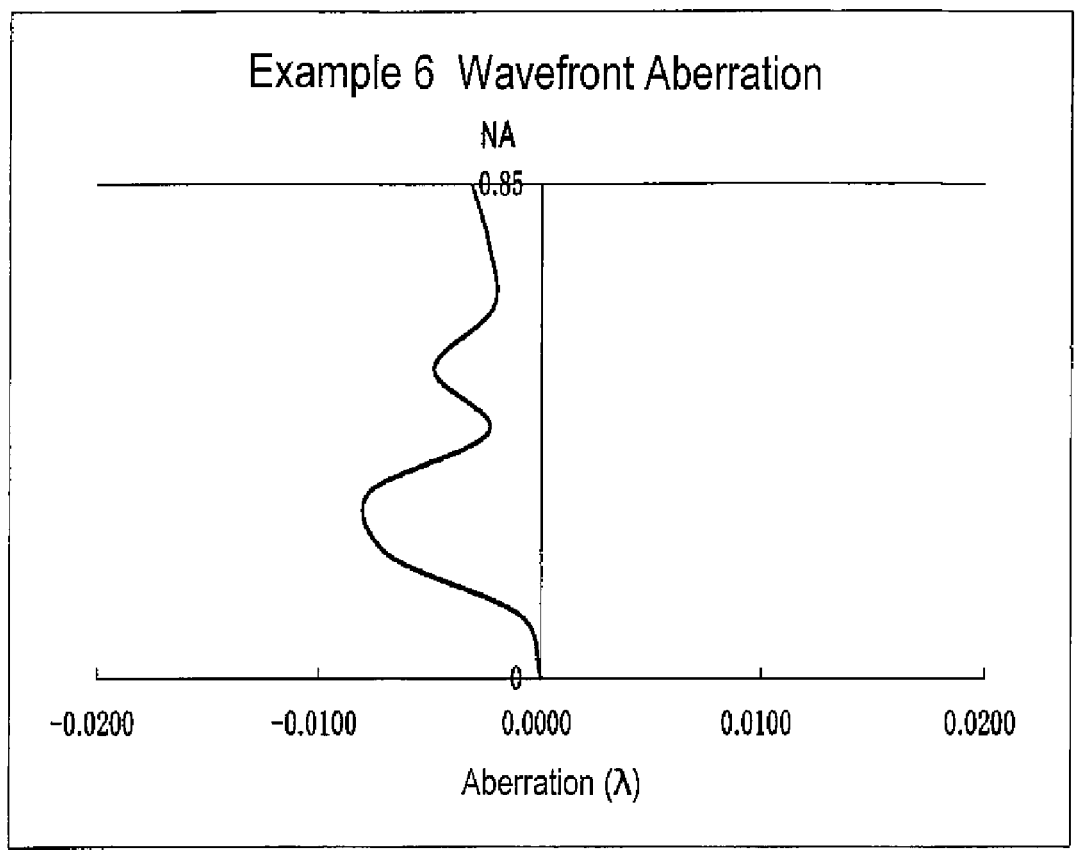
FIG. 13 is a diagram illustrating wavefront aberration in the objective lens according to Example 6 of the invention.

Furthermore, FIG. 13 shows a wavefront aberration curve of the objective lens 8 according to Example 6 at the used light having the wavelength λ when the optical recording medium 9 is set.

As shown in FIG. 13, it is clearly observed that the wavefront aberration is good.

As shown in Table 7, the objective lens 8 according to Example 6 satisfies all the conditional expressions (1) to (7) (including the conditional expressions (3') and (4')).

TABLE 7

| Example | Conditional Expression (1) NA | Conditional Expression (2) d/f | Conditional Expression (3) g/d | Conditional Expression (4) X | Conditional Expression (5) φA (mm) | Conditional Expression (6) Y | Conditional Expression (7) t1 (mm) | λ (nm) |
|---|---|---|---|---|---|---|---|---|
| 1 | 0.85 | 1.164 | 0.598 | 0.527 | 3.886 | 0.434 | 0.100 | 404.7 |
| 2 | 0.85 | 0.966 | 0.623 | 0.535 | 2.992 | 0.422 | 0.100 | 404.7 |
| 3 | 0.85 | 1.256 | 0.594 | 0.511 | 2.992 | 0.448 | 0.100 | 404.7 |
| 4 | 0.85 | 1.276 | 0.592 | 0.523 | 3.001 | 0.423 | 0.100 | 408.0 |
| 5 | 0.85 | 1.250 | 0.607 | 0.501 | 1.999 | 0.453 | 0.0875 | 405.0 |
| 6 | 0.85 | 1.173 | 0.597 | 0.529 | 3.740 | 0.425 | 0.0875 | 405.0 |

TABLE 6

| Wavelength λ (nm) | 405 |
|---|---|
| NA | 0.85 |

| Surface | Curvature radius R (mm) | Surface separating D (mm) | |
|---|---|---|---|
| 1 | Aspheric surface | 2.580 | 1.60532 |
| 2 | Aspheric surface | 0.721 | 1.00000 |
| 3 | ∞ | 0.0875 | 1.61900 |
| 4 | ∞ | | |

Coefficients of aspheric surface expression

| | 1st surface | 2nd surface |
|---|---|---|
| C | 0.665963094 | −0.241274788 |
| K | $1.485482017 \times 10^{-1}$ | −1.592117057 |
| $A_3$ | 0.000000000 | 0.000000000 |
| $A_4$ | $1.458997407 \times 10^{-2}$ | $2.062426083 \times 10^{-1}$ |
| $A_5$ | 0.000000000 | 0.000000000 |
| $A_6$ | $1.248696532 \times 10^{-3}$ | $-1.965367777 \times 10^{-1}$ |
| $A_7$ | 0.000000000 | 0.000000000 |
| $A_8$ | $2.034812605 \times 10^{-3}$ | $1.092415726 \times 10^{-1}$ |
| $A_9$ | 0.000000000 | 0.000000000 |
| $A_{10}$ | $-1.289837288 \times 10^{-3}$ | $-2.610313432 \times 10^{-2}$ |
| $A_{11}$ | 0.000000000 | 0.000000000 |

TABLE 6-continued

| $A_{12}$ | $6.134250622 \times 10^{-4}$ | $-4.565082721 \times 10^{-3}$ |
|---|---|---|
| $A_{13}$ | 0.000000000 | 0.000000000 |
| $A_{14}$ | $-1.409898547 \times 10^{-4}$ | $4.109929533 \times 10^{-3}$ |
| $A_{15}$ | 0.000000000 | 0.000000000 |
| $A_{16}$ | $1.313656939 \times 10^{-5}$ | $-6.899202346 \times 10^{-4}$ |
| $A_{17}$ | 0.000000000 | 0.000000000 |
| $A_{18}$ | 0.000000000 | 0.000000000 |
| $A_{19}$ | 0.000000000 | 0.000000000 |
| $A_{20}$ | 0.000000000 | 0.000000000 |

| Focal length f (mm) | 2.2000 |
|---|---|
| Back focal length bf (mm) | 0.7747 |
| Lens thickness on optical axis d (mm) | 2.580 |
| Protection layer thickness t (mm) | 0.0875 |
| Position of center of gravity g (mm) | 1.539 |
| Mass (gram) | 0.073 |
| Effective diameter of 1st surface φA (mm) | 3.7400 |
| Effective diameter of 2nd surface φB (mm) | 2.4847 |

Furthermore, the objective lens according to the invention is not limited to ones described above, and may be modified in various ways. Also, the optical pickup device and the recording and/or reproducing apparatus for an optical recording medium according to the invention also may be modified in various ways.

For example, the objective lens according to the invention is not limited to the configuration in which all of the light source side surface and the optical recording medium side surface are formed into rotationally symmetric aspheric surfaces as in Examples. If at least one surface (in the case of one surface, it is preferable to select the light source side surface) is formed into an aspheric surface, the other surface may be formed into a flat surface or a spherical surface.

Furthermore, in future, an optical recording medium conforming to a standard in which a wavelength of the used light is further shortened toward ultraviolet region may be developed. Even in that case, the invention can be applied. In this case, as a lens material, it is preferable to use a material having excellent transmittance at a wavelength of the used light. For example, it is possible to use fluorite or quartz as a lens material of the objective lens according to the invention.

What is claimed is:

1. An objective lens for converging used light on a desired position of an optical recording medium which information is recorded in or reproduced from, the objective lens consisting of:
   a single lens element having at least one aspheric surface, wherein the following conditional expressions (1) and (2) are satisfied $$0.70 < NA < 0.98 \quad (1)$$

$$0.50 < g/d < 0.80 \quad (2)$$

where NA denotes a numerical aperture of the objective lens on an optical recording medium side,
   d denotes a thickness, in mm, of the objective lens on an optical axis, and
   g is a distance, in mm, from a first tangential plane that is perpendicular to the optical axis and is tangent to a vertex of a light source side surface of the objective lens, to a center of gravity of the objective lens.

2. The objective lens according to claim 1, wherein the following conditional expression (3) is further satisfied $$0.70 < d/f < 3.00 \quad (3)$$

where f denotes a focal length of the objective lens in mm.

3. The objective lens according to claim 2, wherein the following conditional expression (3') is further satisfied $$0.70 < d/f < 1.40 \quad (3').$$

4. The objective lens according to claim 1, wherein the following conditional expression (4) is further satisfied $$0.35 < X < 0.80 \quad (4),$$

where X is equal to $(X1-X2)\cdot(n-1)/(NA\cdot f)$,
   n denotes a refractive index of the objective lens at a wavelength of the used light,
   X1 denotes a distance, in mm and in an optical axis direction, between the first tangential plane and a most outside position within an effective diameter of the light source side surface, which is a position on the light source side surface on which a marginal ray having the NA is incident, and X1 is defined so that a direction toward the optical recording medium from the first tangential plane serving as a reference point is a positive direction and that a direction toward the light source from the first tangential plane is a negative direction, and
   X2 is a distance, in mm and in the optical axis direction, between (a) a second tangential plane that is perpendicular to the optical axis and is tangent to a vertex of an optical recording medium side surface and (b) a most outside position within an effective diameter of the optical recording medium side surface, which is a position on the optical recording medium side surface on which the marginal ray having the NA is incident, and X2 is defined so that a direction toward the optical recording medium from the second tangential plane serving as a reference point is a positive direction and a direction toward the light source from the second tangential plane is a negative direction.

5. The objective lens according to claim 1, wherein the following conditional expression (5) is further satisfied $$1.0 \leq \Phi A \leq 5.0 \quad (5)$$

where $\Phi A$ denotes the effective diameter of the light source side surface of the objective lens.

6. The objective lens according to claim 1, wherein the following conditional expression (6) is further satisfied $$0.25 < Y < 0.65 \quad (6),$$

where Y is equal to $R1/(n\cdot f)$, and R1 denotes a radius of curvature of the light source side surface of the objective lens near the optical axis.

7. The objective lens according to claim 1, wherein the following conditional expression (4') is further satisfied:

$$0.48 < X < 0.55 \quad (4').$$

8. The objective lens according to claim 1, wherein a wavelength of the light is 405.0±5.0 nm.

9. The objective lens according to claim 1, wherein
   a wavelength of the light is 405.0±5.0 nm,
   the numerical aperture NA is 0.85, and
   a thickness of a protective layer of the optical recording medium is 0.1 mm.

10. The objective lens according to claim 1, wherein
    a wavelength of the light is 405.0±5.0 nm,
    the numerical aperture NA is 0.85,
    aberration is minimized at a position being distant t1 mm from a surface of the optical recording medium to an inside of the optical recording medium, and
    the following conditional expression (7) is satisfied:

$$0.075 \leq t1 \leq 0.1 \quad (7),$$

11. The objective lens according to claim 1, wherein a mass of the objective lens is 0.5 grams or less.

12. An optical pickup device comprising:
    the objective lens according to claim 1; and
    an actuator that performs a focusing operation of the objective lens and a tracking operation of the objective lens.

13. A recording and/or reproducing apparatus for an optical recording medium, the apparatus comprising:
    the optical pickup device according to claim 12.

* * * * *